US011427406B2

(12) United States Patent
Almen

(10) Patent No.: US 11,427,406 B2
(45) Date of Patent: Aug. 30, 2022

(54) CONVEYOR AND A METHOD FOR A BEVERAGE CONTAINER RECYCLER

(71) Applicant: Pure Recycle Oy, Tampere (FI)

(72) Inventor: Kari Almen, Tampere (FI)

(73) Assignee: Pure Recycle OY, Tampere (FI)

( * ) Notice: Subject to any disclaimer, the term of this patent is extended or adjusted under 35 U.S.C. 154(b) by 0 days.

(21) Appl. No.: 17/617,735

(22) PCT Filed: May 12, 2020

(86) PCT No.: PCT/EP2020/063163
§ 371 (c)(1),
(2) Date: Dec. 9, 2021

(87) PCT Pub. No.: WO2020/249346
PCT Pub. Date: Dec. 17, 2020

(65) Prior Publication Data
US 2022/0204280 A1 Jun. 30, 2022

(30) Foreign Application Priority Data
Jun. 12, 2019 (EP) ................................ 19179760

(51) Int. Cl.
B65G 25/10 (2006.01)
G07F 7/06 (2006.01)
G07F 11/42 (2006.01)
G07F 11/24 (2006.01)

(52) U.S. Cl.
CPC ........... *B65G 25/10* (2013.01); *G07F 7/0609* (2013.01); *G07F 11/24* (2013.01); *G07F 11/42* (2013.01)

(58) Field of Classification Search
CPC ................................ B65G 25/08; B65G 25/10
See application file for complete search history.

(56) References Cited

U.S. PATENT DOCUMENTS 2,648,425 A 8/1953 Perrin
3,827,549 A * 8/1974 Hunter ................... B65G 25/08
198/740

FOREIGN PATENT DOCUMENTS

| EP | 0317142 A1 * | 5/1989 |
| FR | 2698621 A1 | 6/1994 |
| GB | 2097743 A | 11/1982 |
| GB | 2166405 A | 5/1986 |
| JP | S5936010 A | 2/1984 |

OTHER PUBLICATIONS

International Search Report and Written Opinion of the ISA/EP in PCT/EP2020/063163, dated Jul. 9, 2020, 7pgs.

* cited by examiner

*Primary Examiner* — William R Harp
(74) *Attorney, Agent, or Firm* — Haukaas Fortius PLLC; Michael H. Haukaas

(57) ABSTRACT

A conveyor has multiple successive fixed stops (17), each suitable for holding the empty beverage container (20) in place. A horizontal ladder frame (12) structure lifts the beverage container (20) in sequences above one fixed stop (17) at a time. Multiple lifting motions transport the beverage container (20) through the successive fixed stops (17). The ladder frame (12) structure has plural transverse beams (14) that reciprocate between a flat position and a raised position. The motion from the float position to the raised position ejects the beverage container (20) above the fixed stop (17).

15 Claims, 4 Drawing Sheets

A)

E)

B)

F)

C)

G)

D)

H)

CONVEYOR AND A METHOD FOR A BEVERAGE CONTAINER RECYCLER

CROSS-REFERENCE TO RELATED APPLICATIONS

This application is a National Stage filing under 35 U.S.C. § 371 of International Application No. PCT/EP2020/063163 filed May 12, 2020, which claims the benefit of European Patent Application No. 19179760.4 filed Jun. 12, 2019, which applications are incorporated herein by reference.

BACKGROUND

The present disclosure relates to a device and a method for conveying beverage containers to be used with beverage container recyclers or reverse vending machines.

Beverage container recyclers are used to detect used, empty containers and to enable recycling. In supermarkets large reverse vending machines may be utilized, wherein a consumer inserts the empty beverage container to the reverse vending machine and receives a payment or a token in return. Some countries, such as Finland, have a centralized recycling system for empty beverage containers.

Reverse vending machines are typically large, bulky devices that occupy a large space. Handling large amount of empty beverage containers requires a lot of storage space. Beverages are being used in large quantities in restaurants or cafés, usually having limited storage space. Therefore, there is a need for less bulky device for recycling beverage containers that may alleviate the problem of recycling in restaurants or cafés.

Beverage container recyclers or reverse vending machines are known to employ complicated conveyor belt systems. Conveyor belts require considerable amount of space, as the auxiliary devices and components such as rollers must be fitted inside the machine. Cleaning the conveyor belt system may be difficult as there are multiple surfaces facing each other, for example the contact area between the roller and the belt or the contact between the belt and the supporting base.

SUMMARY

This summary is provided to introduce a selection of concepts in a simplified form that will be further described below in the detailed description. This summary is intended to neither identify key features or essential features of the claimed subject matter nor to be used to limit the scope of the claimed subject matter. Furthermore, the claimed subject matter is not limited to implementations that solve any or all of the disadvantages noted in any part of this disclosure.

There is provided a conveyor for a beverage container recycler, a method for moving a beverage container in a beverage container recycler and the beverage container recycler. The beverage container recycler may be a reverse vending machine.

The conveyor has multiple successive fixed stops, each suitable for holding the empty beverage container in place or hinder its rolling. A horizontal ladder frame structure lifts the beverage container in sequences above one fixed stop at a time. Multiple lifting motions transport the beverage container through successive fixed stops. The ladder frame structure has plural transverse beams that reciprocate between a flat position and a raised position. The motion from the flat position to the raised position ejects the beverage container above one fixed stop.

The beverage container recycler has multiple functions, such as receiving multiple beverage containers, detecting the beverage container type and issuing the reimbursement for the beverage container. In the present example the recycler compacts the beverage container after registering the container type. The compacting may comprise crushing or pressing the beverage container to smaller space, removing the air from inside the container. The compacted, empty beverage containers are much easier to store and deliver to further recycling facility.

The ladder frame structure is easy to keep clean. Empty beverage containers without caps may release drops of beverage to the conveyor. The ladder frame structure is open and may be cleaned simply by flushing the structure with water and/or washing detergent.

The ladder frame structure allows the beverage container structure to be compact and suitable for restaurant usage. In one use case, a waiter collects beverage containers from the tables and inserts them into the beverage container recycler. The inlet is in one example configured to receive multiple beverage containers simultaneously, while processing them one by one. The beverage container recycler may reside at a logistically convenient place, wherein the waiter is not required to carry the beverage containers to unnecessary distances. Compact dimensions enable the restaurant process to be planned more freely. Alternatively, or in addition, the bartender may insert empty beverage containers to the recycler residing behind the bar counter.

Many of the attendant features will be more readily appreciated as they become better understood by reference to the following detailed description considered in connection with the accompanying drawings. The embodiments described below are not limited to implementations which solve any or all the disadvantages of known conveyor systems.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or any equivalent functions and sequences may be accomplished by different examples.

Although the present examples are described and illustrated herein as being implemented as a conveyor in a beverage container recycler, the beverage container recycler and a method of conveying the beverage container in the beverage container, they are provided as an example and not a limitation. As those skilled in the art will appreciate, the present examples are suitable for application in a variety of different types of recycling devices and reverse vending machines.

Figure 1:
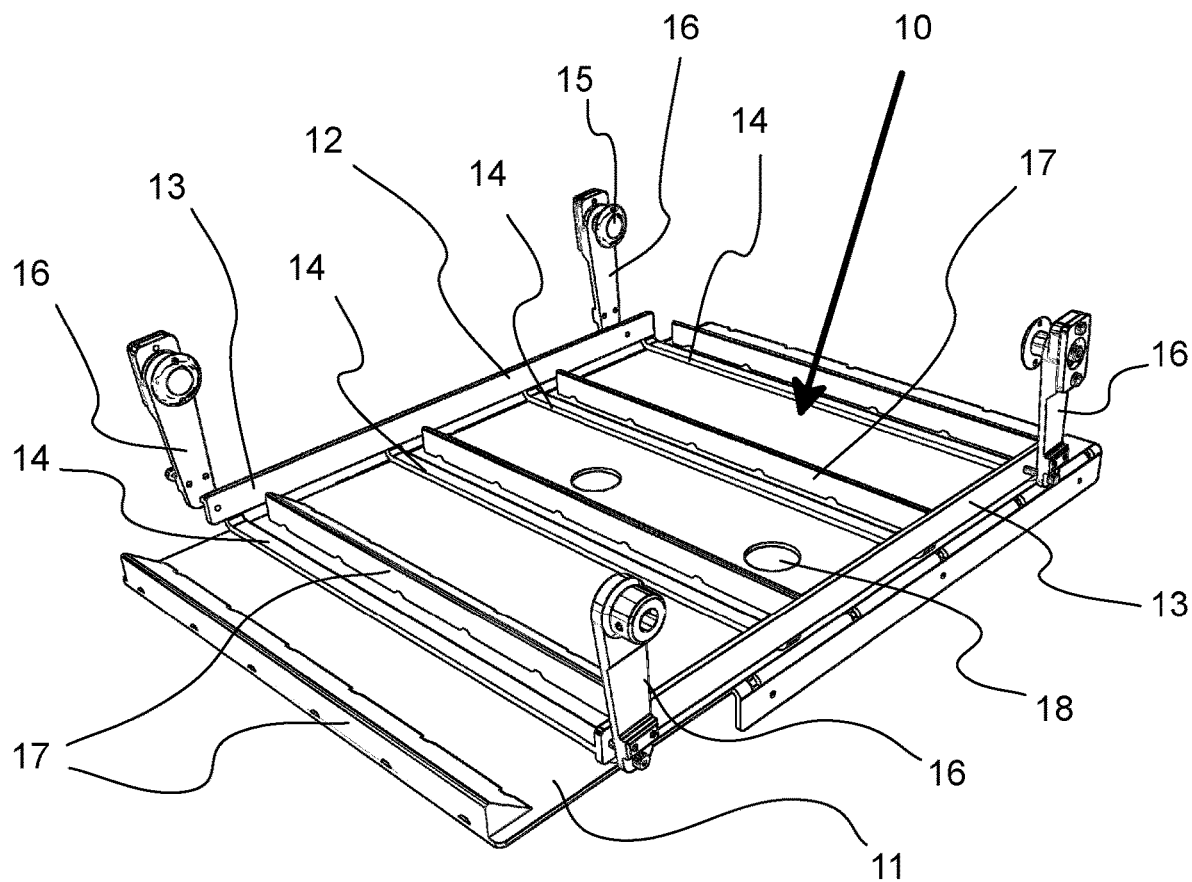
FIG. 1 illustrates schematically one exemplary embodiment a conveyor for beverage containers.

An exemplary embodiment of the conveyor is disclosed schematically in FIG. 1. The illustration focuses only to the conveyor portion of the beverage container recycler. The conveyor may be applied to various portions or functions of the beverage conveyor recycler. In this example the conveyor comprises an inlet 10 for receiving the beverage container from another location. Examples of another location are previous stage of the beverage recycler apparatus or the inlet tray wherein the user loads the empty beverage container to be processed.

The conveyor is arranged on a base 11. The base 11 supports the conveyor and is in one embodiment configured to provide a structural frame to the beverage container recycler. The base 11 may be horizontal or slightly tilted. The tilted base 11 may cause the beverage container to roll gravitationally to a lower direction.

A ladder frame 12 comprises two longitudinal beams 13 spaced apart from each other. The distance between the two longitudinal beams 13 allows the beverage container to fit transversely between the longitudinal beams 13. The longitudinal beams 13 define the direction of travel on the conveyor. Plural transverse beams 14 connect the two longitudinal beams 13, completing the ladder frame 12. The ladder frame 12 is configured to reciprocate between a flat position and a raised position. The ladder frame 12 is supported by four support beams 16 that are configured to rotate from the upper pivot point by at least one actuator 15. In the flat position the ladder frame 12 is close to or in contact with the base 11 as illustrated in FIG. 1.

The base 11 comprises plural consecutive fixed stops 17. The fixed stops 17 are configured to secure the beverage container in place between two consecutive fixed stops 17. In the embodiment where the base 11 is tilted, the fixed stops 17 retain the beverage container from rolling gravitationally. Transverse beams 14 are positioned between consecutive fixed stops 17 when the ladder frame 12 is in the flat position.

The ladder frame 12 is configured to push the beverage container over one fixed stop 17 at a time, when moving from the flat position to the raised position. Each reciprocation of the ladder frame 12 moves the beverage container over the next consecutive fixed stop 17 until it reaches the outlet position of the conveyor. Successive reciprocations cause the beverage container to travel over successive fixed stops 17 through the conveyor.

Figure 2:
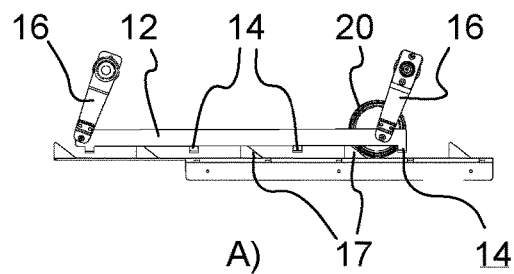
FIG. 2 illustrates schematically steps of the method for moving the beverage container in the beverage container recycler.
Figure 2:
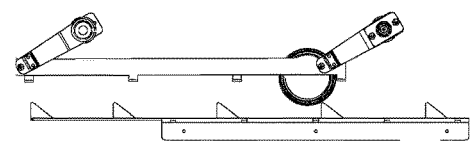
Figure 2:
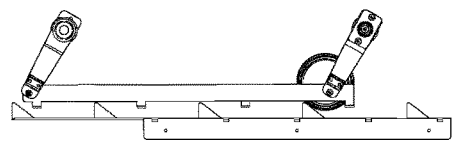
Figure 2:
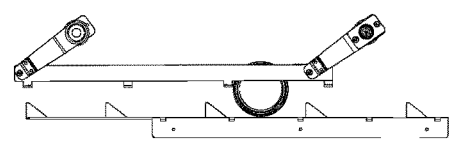
Figure 2:
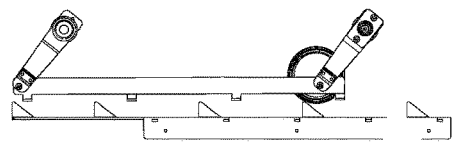
Figure 2:
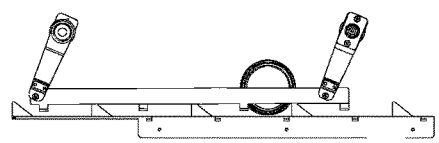
Figure 2:
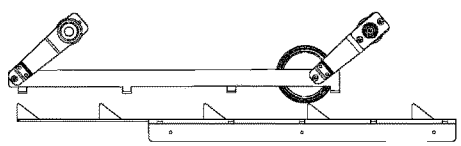
Figure 2:
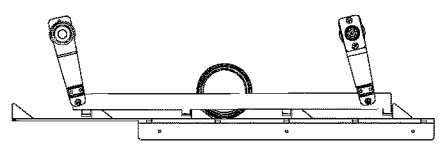

FIG. 2 illustrates schematically steps of the method for moving the beverage container 20 in the beverage container recycler as disclosed herein. The illustration shows successive steps A) to H) in alphabetical order, wherein the ladder frame 12 is moved in horizontal position while pushing the beverage container 20 forward. The illustration is viewed from the side of the conveyor, inside the beverage container recycler.

In step A) the actuator 15 starts to rotate the support beams 16 that support the ladder frame 12 from both ends. The ladder frame 12 stays in the horizontal position during the whole movement, or alternatively, the ladder frame 12 orientation may vary slightly during the movement. The transverse beam 14 catches the beverage container 20 and pushes it against one fixed stop 17. As the ladder frame 12 moves forward, the beverage container 20 rises onto the fixed stop 17, as seen in step B). In steps C) to E) the beverage container 20 is pushed further past the top edge of the fixed stop 17. In step F) the forward motion has pushed the beverage container 20 over the first fixed stop 17, to the base 11, to face the second fixed stop 17. At this point the ladder frame 12 has reached the maximum raised position and starts to move back to the flat position. In step G) the ladder frame 12 pushes the beverage container 20 against the first fixed stop 17. During the motion from the raised position to the flat position the ladder frame 12 returns from under the beverage container 20 while the beverage container 20 leans against the first fixed stop 17. The returning motion does not push the beverage container 20 back over the first fixed stop 17. In step H) the ladder frame 12 has returned to the flat position while the beverage container 20 rests on the base 11 between the first fixed stop and the second fixed stop 17. The following reciprocation of the ladder frame pushes the beverage container 20 over the second fixed stop 17, to face the third fixed stop 17. Providing multiple reciprocations causes the beverage container 20 to travel over plural fixed stops 17 through the conveyor. In the present example the ladder frame 12 is configured to travel a curved path in horizontal position, following the radius of the support beams 16. In one embodiment the ladder frame 12 is arranged to follow more complex curved path, for example in the shape of parallelogram, oval radius or the combination of various shapes.

Figure 3:
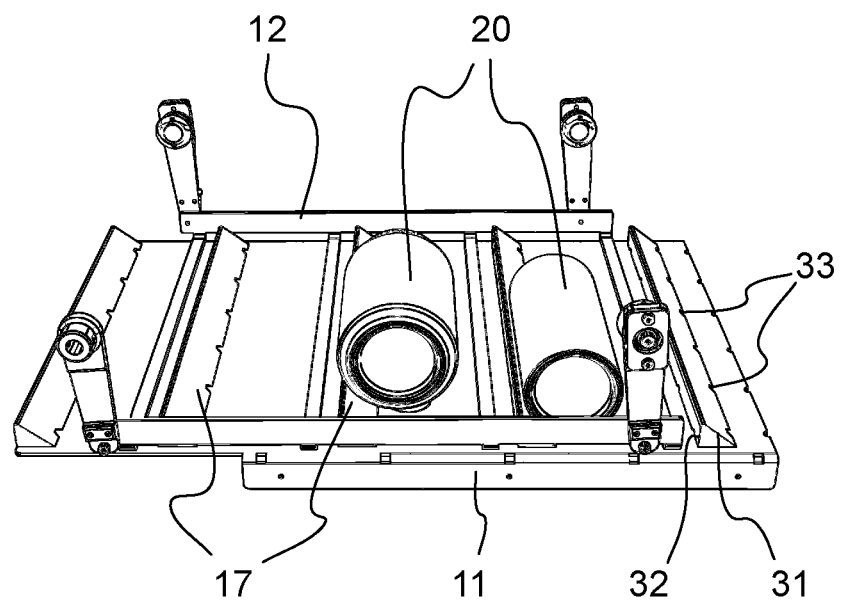
FIG. 3 illustrates schematically one exemplary use scenario of the conveyor.

FIG. 3 illustrates schematically one exemplary use scenario of the conveyor, wherein multiple beverage containers 20 travel through the conveyor simultaneously. Between two successive fixed stops 17 and on the base 11 is configured a space for single beverage container 20. One reciprocation of the ladder frame 12 moves each beverage container 20 to the next space between the fixed stops 17 until the beverage container reaches the end of the conveyor.

In one embodiment the fixed stops 17 comprise a first slanted side 31. The first slanted side is on the leading side of the fixed stop 17, providing a ramp for the beverage container 20 to travel to one direction, over the fixed stops 17. The trailing side of the fixed stops 17 is configured to hinder the beverage container 20 to travel backwards over the fixed stop 17. In one embodiment the fixed stops 17 comprise a second vertical side 32 for retaining the beverage container 20 from rising over the fixed stop 17 when the ladder frame 12 returns to the flat position. In one embodiment the second vertical side 32 is not present in the fixed stop 17, wherein the trailing side comprises reverse side of the leading side, such as the first slanted side 31. The fixed stop 17 may be a simple flat ramp. In one embodiment the fixed stops 17 are made of steel wire, wherein the fixed stops allow liquids to flow freely though the conveyor.

In one embodiment the fixed stops 17 comprise openings 33 facing the base 11 for allowing a liquid to flush the conveyor. The liquid may be water or washing detergent. The openings 33 enable flushing the conveyor as the liquid passes through the openings 33. The base 11 may comprise openings 18 to allow the liquids to be flushed further. The fixed stops 17 may be removable to enable further maintenance.

In one embodiment the beverage container recycler comprises a compacting assembly, for example a crusher or a press configured to compact the beverage container 20 and enable reducing the storage and transporting needs per each beverage container 20. The beverage container 20 may be a can made of metal, a bottle made of plastic or a bottle made of glass.

Figure 4:
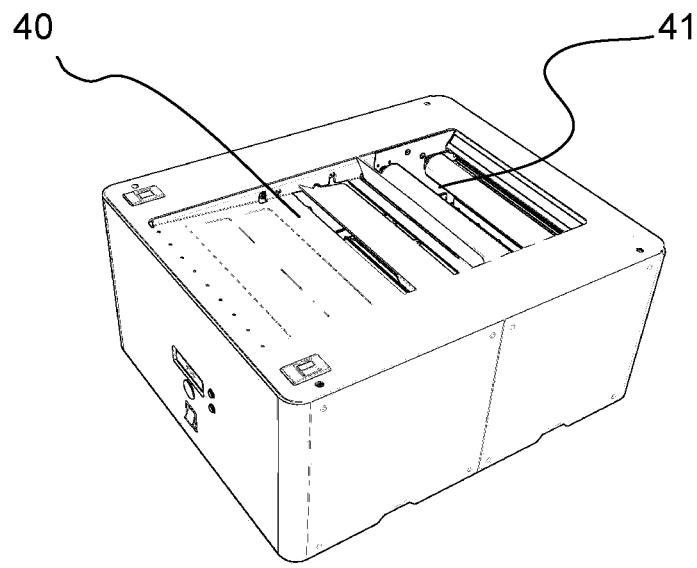
FIG. 4 illustrates one exemplary embodiment of the beverage container recycler housing.
Figure 5:
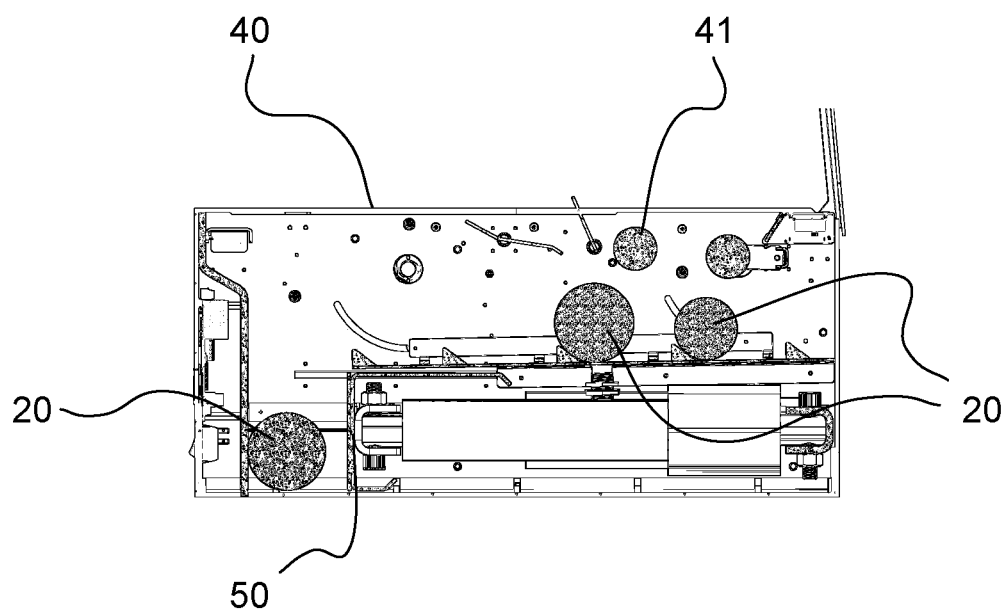
FIG. 5 is a cross-sectional view of the beverage container recycler housing.

The beverage container recycler may be fitted into small space in a restaurant, as the conveyor enables compact dimensions for the recycler housing. FIG. 4 illustrates one exemplary embodiment of the beverage container recycler housing, having the inlet tray 40 and a beverage container detector 41. FIG. 5 is a cross-sectional view of the same exemplary beverage container recycler. The illustration shows multiple beverage containers 20 in various stages. The press 50 is configured to compress the beverage container 20, which may be dropped to recycling bin positioned underneath the recycler.

A conveyor for a beverage container recycler is disclosed. The conveyor comprises an inlet for receiving the beverage container; a base for the conveyor; a ladder frame, comprising two longitudinal beams spaced apart from each other, allowing the beverage container to fit transversely between the longitudinal beams; and plural transverse beams connecting the two longitudinal beams; an actuator for reciprocating the ladder frame between a flat position and a raised position; plural fixed stops for retaining the beverage container at the base, between the transverse beams when the ladder frame is in the flat position; wherein the ladder frame is configured to push the beverage container over one fixed stop when moving from the flat position to the raised position and multiple reciprocations cause the beverage container to travel over plural fixed stops through the conveyor. In one embodiment, the ladder frame is configured to travel a curved path in horizontal position. In one embodiment, the fixed stops comprise a first slanted side providing a ramp for allowing the beverage container to travel over the fixed stops. In one embodiment, the fixed stops comprise a second vertical side for retaining the beverage container. In one embodiment, the fixed stops comprise openings facing the base for allowing a liquid to flush the conveyor. In one embodiment, the fixed stops are made of steel wire. In one embodiment, the conveyor comprises an outlet for dispensing the beverage container to a compacting assembly.

Alternatively, or in addition, a beverage container recycler is disclosed, comprising the conveyor described hereinbefore.

Alternatively, or in addition, a method for moving a beverage container in a beverage container recycler is disclosed. The recycler comprises an inlet for receiving the beverage container; a conveyor; a base for the conveyor; a ladder frame, comprising two longitudinal beams spaced apart from each other, allowing the beverage container to fit transversely between the longitudinal beams; and plural transverse beams connecting the two longitudinal beams; plural fixed stops for retaining the beverage container at the base, between the transverse beams when the ladder frame is in the flat position. The method comprises pushing the beverage container by the ladder frame over one fixed stop when moving from a flat position to a raised position; and providing multiple reciprocations for causing the beverage container to travel over plural fixed stops through the conveyor. In one embodiment, the method comprises causing the ladder frame to travel a curved path in horizontal position. In one embodiment, the method comprises causing the beverage container to travel over the fixed stop via a first slanted side providing a ramp to the fixed stop. In one embodiment, the method comprises retaining the beverage container at the fixed stops by a second vertical side. In one embodiment, the method comprises flushing the conveyor via openings facing the base at the fixed stops.

In one embodiment, the fixed stops are made of steel wire. In one embodiment, the method comprises dispensing the beverage container to a compacting assembly via an outlet arranged at the conveyor.

Alternatively, or in addition, the conveyor functionality can be implemented, at least in part, by one or more hardware components or hardware logic components. An example of the control system described hereinbefore is a computing-based device comprising one or more processors, which may be microprocessors, controllers or any other suitable types of processors, for processing computer-executable instructions to control the operation of the device, in order to control one or more sensors, receive sensor data and use the sensor data. The computer-executable instructions may be provided using any computer-readable media accessible by a computing-based device. The computer-readable media may include, for example, computer storage media, such as memory and communication media. The computer storage media, such as the memory, includes volatile and non-volatile, removable and non-removable media implemented in any method or technology for storage of information, such as computer-readable instructions, data structures, program modules or other data. The computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, the communication media may embody computer-readable instructions, data structures, program modules, or other data in a modulated data signal, such as a carrier wave, or other transport mechanism. As defined herein, the computer storage media do not include the communication media. Therefore, a computer storage medium should not be interpreted to be a propagating signal per se. Propagated signals may be present in a computer storage medium, but propagated signals per se are not examples of computer storage media. Although the computer storage media are shown within the computing-based device, it will be appreciated that the storage may be distributed or located remotely and accessed via a network or other communication link, for example, by using a communication interface.

The system may comprise an input/output controller arranged to output display information to a display device which may be separate from or integral to the apparatus or device. The input/output controller is also arranged to receive and process input from one or more devices, such as a user input device (e.g. a mouse, keyboard, camera, microphone or other sensor).

Any range or device value given herein may be extended or altered without losing the effect sought.

Although at least a portion of the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that any reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A conveyor for a beverage container recycler, comprising:
   an inlet for receiving the beverage container; and
   a base for the conveyor;
     characterized by comprising:
     a ladder frame, comprising two longitudinal beams spaced apart from each other, allowing the beverage container to fit transversely between the longitudinal beams; and plural transverse beams connecting the two longitudinal beams;
     an actuator for reciprocating the ladder frame between a flat position and a raised position;
     plural fixed stops for retaining the beverage container at the base, between the transverse beams when the ladder frame is in the flat position; wherein
   the ladder frame is configured to push the beverage container over one fixed stop when moving from the flat position to the raised position and multiple reciprocations cause the beverage container to travel over plural fixed stops through the conveyor.

2. A conveyor according to claim 1, wherein the ladder frame is configured to travel a curved path in horizontal position.

3. A conveyor according to claim 1, wherein the fixed stops comprise a first slanted side providing a ramp for allowing the beverage container to travel over the fixed stops.

4. A conveyor according to claim 3, wherein the fixed stops comprise a second vertical side for retaining the beverage container.

5. A conveyor according to claim 1, wherein the fixed stops comprise openings facing the base for allowing a liquid to flush the conveyor.

6. A conveyor according to claim 1, wherein the fixed stops are made of steel wire.

7. A conveyor according to claim 1, wherein the conveyor comprises an outlet for dispensing the beverage container to a compacting assembly.

8. A beverage container recycler, comprising the conveyor according to claim 1.

9. A method for moving a beverage container in a beverage container recycler, comprising:
   an inlet for receiving the beverage container;
   a conveyor; and
   a base for the conveyor;
     characterized in that the conveyor comprises:
     a ladder frame, comprising two longitudinal beams spaced apart from each other, allowing the beverage container to fit transversely between the longitudinal beams; and plural transverse beams connecting the two longitudinal beams;
     plural fixed stops for retaining the beverage container at the base, between the transverse beams when the ladder frame is in the flat position; wherein the method comprises:
     pushing the beverage container by the ladder frame over one fixed stop when moving from a flat position to a raised position; and providing multiple reciprocations for causing the beverage container to travel over plural fixed stops through the conveyor.

10. A method according to claim 9, comprising causing the ladder frame to travel a curved path in horizontal position.

11. A method according to claim 9, wherein the beverage container to travel over the fixed stop via a first slanted side providing a ramp to the fixed stop.

12. A method according to claim 11, comprising retaining the beverage container at the fixed stops by a second vertical side.

13. A method according to claim 9, comprising flushing the conveyor via openings facing the base at the fixed stops.

14. A method according to claim 9, wherein the fixed stops are made of steel wire.

15. A method according to claim 9, comprising dispensing the beverage container to a compacting assembly via an outlet arranged at the conveyor.

* * * * *